United States Patent
Kim et al.

(10) Patent No.: US 9,299,967 B2
(45) Date of Patent: *Mar. 29, 2016

(54) SECONDARY BATTERY COMPRISING INSULATOR

(75) Inventors: Do Gyun Kim, Cheongwon-gun (KR); Dong-Myung Kim, Daejeon (KR); Sang Bong Nam, Cheonan-Si (KR); Dong Sub Lee, Icheon-si (KR); Jun Ho Moon, Cheongwon-gun (KR); Sang Sok Jung, Cheongwon-gun (KR)

(73) Assignee: LG Chem, Ltd., Seoul (KR)

( * ) Notice: Subject to any disclaimer, the term of this patent is extended or adjusted under 35 U.S.C. 154(b) by 62 days.

This patent is subject to a terminal disclaimer.

(21) Appl. No.: 14/127,443

(22) PCT Filed: Jun. 4, 2012

(86) PCT No.: PCT/KR2012/004386
§ 371 (c)(1),
(2), (4) Date: Mar. 12, 2014

(87) PCT Pub. No.: WO2013/002496
PCT Pub. Date: Jan. 3, 2013

(65) Prior Publication Data
US 2014/0186670 A1 Jul. 3, 2014

(30) Foreign Application Priority Data
Jun. 30, 2011 (KR) .................. 10-2011-0064278

(51) Int. Cl.
*H01M 2/18* (2006.01)
*H01M 2/02* (2006.01)
(Continued)

(52) U.S. Cl.
CPC ............... *H01M 2/18* (2013.01); *H01M 2/022* (2013.01); *H01M 2/0482* (2013.01); *H01M 2/08* (2013.01);
(Continued)

(58) Field of Classification Search
None
See application file for complete search history.

(56) References Cited

U.S. PATENT DOCUMENTS

2007/0020515 A1* 1/2007 Lee et al. .................. 429/129
2007/0154789 A1 7/2007 Chang et al.
(Continued)

FOREIGN PATENT DOCUMENTS

EP    1 049 180 A1    11/1999
EP    2 045 854 A2    4/2009
(Continued)

OTHER PUBLICATIONS

International Search Report for PCT/KR2012/004386 mailed on Jan. 2, 2013.
(Continued)

*Primary Examiner* — Patrick Ryan
*Assistant Examiner* — Christopher Domone
(74) *Attorney, Agent, or Firm* — Birch, Stewart, Kolasch & Birch, LLP

(57) ABSTRACT

Disclosed is a secondary battery having a structure in which a jelly-roll having a cathode/separator/anode structure is mounted in a cylindrical battery case, wherein a plate-shaped insulator mounted on top of the jelly-roll includes a perforated inlet enabling gas discharge and penetration of electrode terminals, a plurality of fine pores having a size that allows permeation of an electrolyte solution, but does not allow permeation of foreign materials, and a plurality of strip or bead shaped protrusions disposed in transverse and/or longitudinal directions on one or both surfaces of the insulator.

11 Claims, 3 Drawing Sheets

(51) Int. Cl.
*H01M 2/04* (2006.01)
*H01M 2/08* (2006.01)
*H01M 2/30* (2006.01)
*H01M 10/052* (2010.01)

(52) U.S. Cl.
CPC .............. *H01M 2/30* (2013.01); *H01M 10/052* (2013.01); *H01M 2220/20* (2013.01); *Y02E 60/122* (2013.01); *Y02P 70/54* (2015.11); *Y02T 10/7011* (2013.01)

(56) References Cited

U.S. PATENT DOCUMENTS

| | | |
|---|---|---|
| 2007/0154804 A1 | 7/2007 | Kim et al. |
| 2009/0061310 A1* | 3/2009 | Kim et al. .................... 429/185 |
| 2010/0055555 A1* | 3/2010 | Fukase et al. ................ 429/145 |
| 2011/0086265 A1 | 4/2011 | Suzuki |

FOREIGN PATENT DOCUMENTS

| | | |
|---|---|---|
| JP | 10-284046 A | 10/1998 |
| JP | 2004-241251 A | 8/2004 |
| JP | 2009-301892 A | 12/2009 |
| KR | 20-1999-000716 U | 1/1999 |
| KR | 10-0670441 B1 | 1/2007 |
| KR | 10-2007-0071242 A | 7/2007 |
| KR | 10-2007-0071244 A | 7/2007 |

OTHER PUBLICATIONS

European Search Report for Application No. 12 805 102.6 dated Apr. 24, 2015.

* cited by examiner

SECONDARY BATTERY COMPRISING INSULATOR

TECHNICAL FIELD

The present invention relates to a secondary battery. More specifically, the present invention relates to a secondary battery having a structure in which a jelly-roll having a cathode/separator/anode structure is mounted in a cylindrical battery case, wherein a plate-shaped insulator mounted on the top of the jelly-roll includes a perforated inlet enabling gas discharge and penetration of electrode terminals, a plurality of fine pores having a size that allows permeation of an electrolyte solution, but does not allow permeation of foreign materials, and a plurality of strip or bead shaped protrusions disposed in transverse and/or longitudinal directions on one or both surfaces of the insulator.

BACKGROUND ART

The development of techniques associated with mobile devices and increase in demand therefor have brought about rapid increase in the demand for secondary batteries as energy sources. Among secondary batteries, lithium secondary batteries with high energy density, high driving voltage and superior storage and lifespan characteristics are widely used as energy sources of various electric products including mobile devices.

Depending on the shape of the battery case, the secondary battery may be divided into cylindrical and rectangular batteries mounted in cylindrical and rectangular metal cans, respectively, and a pouch-shaped battery mounted in a pouch-shaped case made of an aluminum laminate sheet. Of these, the cylindrical battery has advantages of relatively high capacity and superior structural stability. The electrode assembly mounted in the battery case is an electricity-generating device enabling charge and discharge that has a cathode/separator/anode laminate structure and is divided into a jelly-roll type in which an electrode assembly including a separator interposed between a cathode and an anode, each made of an active material-coated long sheet, is rolled, a stack-type in which a plurality of cathodes and a plurality of anodes are laminated in this order such that a separator is interposed between the cathode and the anode and a stack/folding type which is a combination of a jelly-roll type and a stack type. Of these, the jelly-roll-type electrode assembly has advantages of easy manufacture and high energy density per weight.

In this regard, a conventional cylindrical secondary battery is shown in FIG. 1. An insulator generally used for the cylindrical secondary battery is shown in plan views in FIGS. 2 and 3.

Referring to the drawings, a cylindrical secondary battery 100 is manufactured by mounting a jelly-roll type (rolled-type) electrode assembly 120 in a battery case 130, injecting an electrolytic solution into the battery case 130 and coupling a cap assembly 140 provided with an electrode terminal (for example, a cathode terminal; not shown) to the open top of the case 130.

The electrode assembly 120 is obtained by inserting a separator 123 between a cathode 121 and an anode 122 and rolling the resulting structure into a round shape. A cylindrical center pin 150 is inserted into the core (center) of the jelly-roll. The center pin 150 is generally made of a metal to impart a predetermined strength and has a hollow-shaped cylindrical structure of a roundly bent plate material. Such a center pin 150 sets and supports the electrode assembly and serves as a passage, enabling discharge of gas generated by internal reaction during charge and discharge, and operation.

In addition, a plate-shaped insulator 180*a* is mounted on the top of the electrode assembly 120, and is provided in the center thereof with an inlet 181*a* communicating with the through hole 151 of the center pin 150 so that gas is discharged and the cathode tap 142 of the electrode assembly 120 is connected to the cap plate 145 of the cap assembly 140.

However, the insulator 180*a* arranged on the top of the jelly-roll is a structure that blocks a passage through which an electrolyte solution permeates into a battery in the process of injecting an electrolyte solution into the battery. For this reason, the electrolyte solution permeates the battery only through the inlet 181*a* communicating with the center pin 150 and a region excluding the insulator 180*a*, thus disadvantageously requiring a long time for injection of electrolyte and consequently causing deterioration in production efficiency.

In order to improve permeability of the electrolyte solution, as shown in FIG. 3, a partial connection member 180*b* having a structure in which a plurality of through pores 182*b* are formed around an inlet 181*b* is suggested.

However, this structure is found to have serious problems in terms of safety. That is, conductive impurity particles such as metal powders generated in the process of manufacturing and/or assembling the cap assembly 140, the battery case 130 and the like are permeated into the electrode assembly 120 through the through pores 182*b* that are perforated in the insulator 180*b*, thus disadvantageously causing occurrence of short circuit or deterioration in battery lifespan.

Accordingly, there is an increasing need for secondary batteries that enhance injection processability while maintaining electrical safety.

DISCLOSURE

Technical Problem

Therefore, the present invention has been made to solve the above and other technical problems that have yet to be resolved.

It is one object of the present invention to provide a secondary battery that can improve permeability of electrolyte solution, and safety, performance and productivity of batteries through a novel insulator.

Technical Solution

In accordance with one aspect of the present invention, provided is a secondary battery having a structure in which a jelly-roll having a cathode/separator/anode structure is mounted in a cylindrical battery case, wherein a plate-shaped insulator mounted on the top of the jelly-roll includes: a perforated inlet enabling gas discharge and penetration of electrode terminals; a plurality of fine pores having a size that allows permeation of an electrolyte solution, but does not allow permeation of foreign materials; and a plurality of strip or bead shaped protrusions disposed in transverse and/or longitudinal directions on one or both surfaces of the insulator.

In general, a cylindrical secondary battery is fabricated by inserting a jelly-roll into a cylindrical can, mounting an insulator on the top of the jelly-roll and performing a beading process to fix the jelly-roll. Such a beading process is carried out by applying pressure in a longitudinal direction while bending the peripheral surface of the cylindrical can using a metal. In this process, metals contact one another to cause deformation and fine metal fragments are thus generated.

When these fine metal fragments are incorporated into batteries, short circuit occurs. Accordingly, the insulator should facilitate injection of electrolyte solution, while not allowing permeation of foreign materials such as fine metal fragments.

Particularly preferably, the cylindrical secondary battery can greatly improve injectability, since it allows permeation of electrolyte solution over the entire surface of the insulator through the insulator having a structure mounted on the top of the jelly-roll when the electrolyte solution is injected, and can prevent short circuit, as compared to conventional insulators having a larger diameter. These facts can be seen from experimental results described below.

The strip or bead shaped protrusions may be formed by pressing parts other than the protrusions. Based on such structure, mechanical properties of insulator can be improved.

In general, as porosity increases, the density of insulator decreases and mechanical strength is deteriorated. That is, smooth injection of electrolyte solution is inversely proportional to gas discharge and mechanical strength. However, the present inventors confirmed that porosity can be maintained and desired mechanical strength can be secured by forming protrusions described above. Also, surface friction can be improved by forming the protrusions. That is, during a beading process to fix the jelly-roll after the insulator is mounted in the process of manufacturing cylindrical batteries, when frictional force of insulator is excessively low, a problem in which the insulator causes damage to electrode terminals perforated while rotating can be prevented.

Any material may be used for the insulator without particular limitation so long as it has insulating properties, the insulator may be composed of an electrical-insulating polymer resin or an electrical-insulating polymer composite and, specifically, the polymer resin may be one or more selected from the group consisting of polyethylene (PE), polypropylene (PP), polybutylene (PB), polystyrene (PS), polyethylene terephthalate (PET), natural rubbers and synthetic rubbers.

The fine pores have a size, providing electric insulating property, as an inherent function of insulator and allowing permeation of an electrolyte solution during injection of electrolyte solution. In a preferred embodiment, the fine pores may have a diameter of 1 μm to 100 μm.

As confirmed by the present inventors, when the size (diameter) of pores exceeds 100 μm, fine metal particles produced by a cap assembly, a battery case or the like may be incorporated into a jelly-roll through pores of the insulator in the process of assembling batteries, thus disadvantageously causing short-circuit.

In a preferred embodiment, the fine pores may be spaced from one another by a predetermined distance over the entire surface of the insulator. Here, the distance often means a distance between fine pores perforated on the insulator. By forming the fine pores over the entire surface of the insulator, injection of electrolyte solution is advantageously facilitated. By forming the fine pores by a predetermined distance, physical properties can be uniformly maintained over the entire surface of the insulator. When pores form clusters in specific parts, the cluster parts disadvantageously have deteriorated physical strength, as compared to other parts.

The insulator according to the present invention may have a variety of shapes.

In one embodiment, the insulator comprises a material molded with a polymer resin or composite and may have a structure in which fine pores perforate through the molded material (plate-typed body).

In another embodiment, the insulator comprises a woven-fabric in which long fibers made of a polymer resin or composite form fine pores.

In another embodiment, the insulator comprises a non-woven fabric in which short fibers made of a polymer resin or composite form fine pores.

When the fine pores are perforated while passing through the molded material, permeation of electrolyte solution may be relatively unfavorable and deteriorated gas discharge due to surface tension and restoring force of the perforated part, as compared to woven and non-woven fabrics. On the other hand, woven and non-woven fabrics are free of a bending phenomenon resulting from formation of pressing sheets, thus advantageously enhancing processability.

The short fibers are partially bonded through needle punching or thermal fusion, or using an adhesive agent to form a non-woven fabric. The non-woven fabric has a structure in which fibers are randomly entangled. The short fibers may be partially bonded through needle punching or thermal fusion, or using an adhesive agent, in order to fix the entangled fibers.

In a preferred embodiment, the protrusions cross one another in transverse and longitudinal directions to form a checker pattern. When the protrusions are formed in one direction, there may be present difference in mechanical strength according to directions. Accordingly, preferably, the protrusions cross one another in transverse and longitudinal directions to form a checker pattern.

Consequently, the protrusions may have a structure in which an embossing pattern is present over the entire surface of the insulator. Based on the embossing pattern, mechanical strength and surface frictional force can be improved.

The embossing pattern may have a structure in which non-thermally fused parts form protrusions by thermally fusing a part of the insulator. The protrusions and thermally-fused parts may be an island or continuous shape.

In a specific embodiment, the insulator comprises a non-woven fabric made of short fibers, parts bonded by thermal fusion are disposed by a predetermined distance over the entire surface of the insulator, and protrusions having a barrier shape that are not thermally fused are disposed between the bonded parts. Preferably, the insulator has a thickness of 0.1 mm to 0.5 mm. When the thickness of the insulator is excessively small, the insulator cannot sufficiently exert insulation and, on the other hand, when the thickness is excessively large, a decrease in size of jelly-roll is induced in a battery case having a constant size and battery capacity is disadvantageously reduced.

Preferably, the secondary battery according to the present invention may be applied to a lithium secondary battery fabricated by impregnating a lithium-containing electrolyte solution in the jelly-roll.

The present invention also provides a device comprising the secondary battery as a power source.

Preferably, the device according to the present invention may be used for mobile devices such as cellular phones and portable computers as well as electric vehicles, hybrid electric vehicles, plug-in hybrid electric vehicles and power-storing devices in terms of superior lifespan and safety.

Effects of Invention

As apparent from the fore-going, the secondary battery according to the present invention comprises an insulator that is provided over the entire surface thereof with fine pores and includes protrusions, thereby advantageously enabling an electrolyte solution to be permeated over the entire surface of the insulator while preventing short circuit and thus ultimately greatly improving safety, performance and lifespan of batteries.

BRIEF DESCRIPTION OF THE DRAWINGS

The above and other objects, features and other advantages of the present invention will be more clearly understood from the following detailed description taken in conjunction with the accompanying drawings, in which.

BEST MODE

Now, the present invention will be described in more detail with reference to the following examples. These examples are provided only for illustrating the present invention and should not be construed as limiting the scope and spirit of the present invention.

Figure 4:
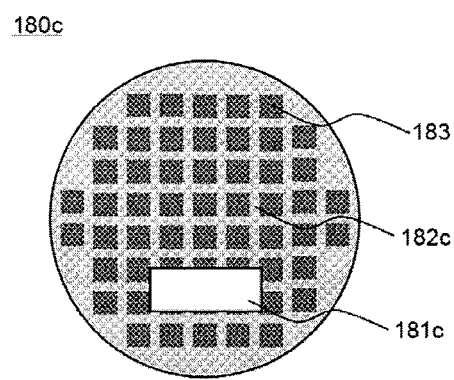
FIG. 4 is a plan view illustrating an insulator according to one embodiment of the present invention.
Figure 5:
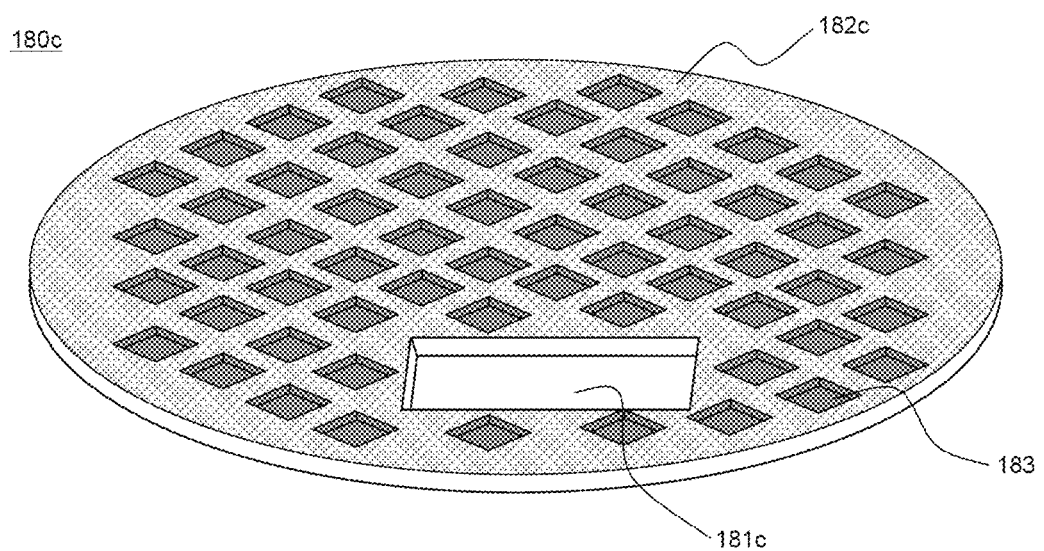
FIG. 5 is a perspective view illustrating an insulator according to one embodiment of the present invention.

FIG. 4 is a plan view schematically illustrating an insulator according to one embodiment of the present invention. FIG. 5 is a perspective view schematically illustrating an insulator according to another embodiment of the present invention.

Figure 1:
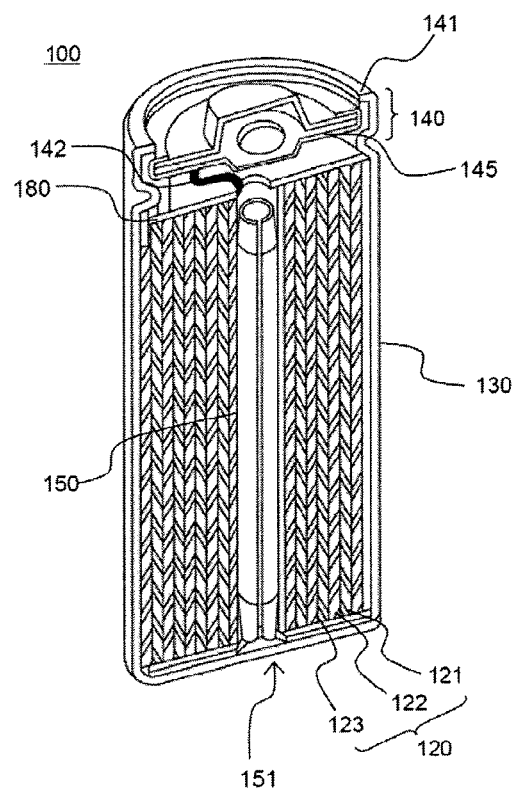
FIG. 1 is a representative sectional schematic view illustrating a cylindrical secondary battery.

Referring to FIGS. 4, 5 and 1, a secondary battery 100 has a structure in which a jelly-roll 120 having a structure of cathode 121/separator 123/anode 122 is mounted in a cylindrical battery case 130, wherein an insulator 180 is mounted on the top of the jelly-roll 120.

The insulator 180c is composed of polyethylene terephthalate (PET) with a thickness of about 0.4 mm, is provided at one side thereof with an inlet 181c and is provided over the entire surface thereof with a plurality of fine pores 182c having a diameter of 10 to 30 μm that are spaced from one another by a predetermined distance. Depressed embossing 183 structures are disposed in transverse and/or longitudinal directions to form protrusions corresponding to continuous raised embossing structures.

Accordingly, through the plurality of fine pores 182c, an electrolyte solution permeates into the entire surface of the insulator 180c when injected, thus causing considerable improvement in injectability and preventing occurrence of short circuit. Also, through formation of protrusions based on the depressed embossing 183 structures, mechanical strength of insulator can be increased, and processability can be improved due to increase in surface frictional force.

Now, the present invention will be described in more detail with reference to the following examples. These examples are provided only to illustrate the present invention and should not be construed as limiting the scope and spirit of the present invention.

Example 1

An insulator having a thickness of 0.4 mm in which a rectangular inlet having a width of 6 mm and a length of 2.5 mm was perforated at one side thereof, a plurality of fine pores having a diameter of 1 to 30 μm were dispersed by a predetermined distance of about 10 to about 30 μm and depressed embossing structures formed a pattern was manufactured using a polypropylene phthalate (PET) sheet, as shown in FIG. 4. Then, the insulator was mounted on top of a jelly-roll in which a cathode/separator/anode was rolled based on a center pin and a cylindrical secondary battery of an 18650 standard (diameter 18 mm, length 65 mm) was manufactured in a state that fine metal powders generated in the process of battery assembly were arranged on the insulator.

Example 2

An insulator and a secondary battery were manufactured in the same manner as in Example 1 except that an insulator, in which a plurality of fine pores having a diameter of 100 μm were uniformly distributed by a predetermined distance of about 120 μm over the entire surface of the insulator, was prepared.

Example 3

An insulator and a secondary battery were manufactured in the same manner as in Example 1 except that a polypropylene (PP) sheet was used as a material for the insulator, instead of the polyethylene terephthalate (PET) sheet.

Example 4

An insulator having a depressed embossing pattern structure was manufactured using a polyethylene terephthalate (PET) woven fabric that formed fine pores of 15 μm as a material for the insulator. An insulator and a secondary battery were manufactured in the same manner as in Example 1 except that the material for the insulator was used.

Example 5

An insulator having a depressed embossing pattern structure was manufactured using a polyethylene terephthalate (PET) woven fabric that formed fine pores of 15 μm on average as a material for the insulator. An insulator and a secondary battery were manufactured in the same manner as in Example 1 except that the material for the insulator was used.

Comparative Example 1

Figure 2:
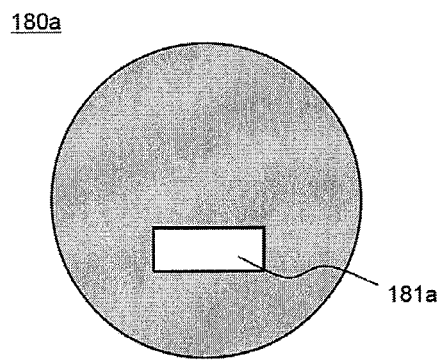
FIG. 2 is a plan view illustrating an insulator used for the secondary battery of FIG. 1 according to one embodiment.

An insulator and a secondary battery were manufactured in the same manner as in Example 1 except that a plurality of pores was not included, as shown in FIG. 2.

Comparative Example 2

Figure 3:
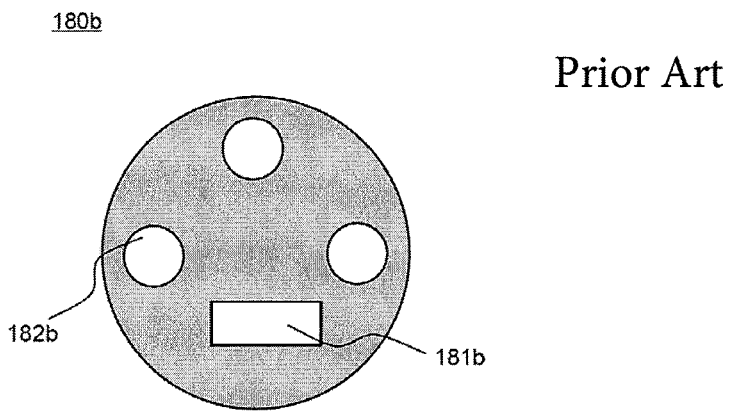
FIG. 3 a plan view illustrating an insulator used for the secondary battery of FIG. 1 according to another embodiment.

An insulator and a secondary battery were manufactured in the same manner as in Example 1 except that three through pores with a diameter of 2.5 mm were formed, as shown in FIG. 3.

Comparative Example 3

An insulator and secondary battery were manufactured in the same manner as in Example 1 except that a plurality of fine pores having a diameter of 150 μm were uniformly distributed by a predetermined distance of about 120 μm over the entire surface of the insulator.

Comparative Example 4

An insulator and a secondary battery were manufactured in the same manner as in Comparative Example 1 except that polypropylene (PP) was used as a material for the insulator, instead of polyethylene terephthalate (PET).

Comparative Example 5

An insulator and a secondary battery were manufactured in the same manner as in Comparative Example 1 except that a polyethylene terephthalate (PET) woven fabric that did not form fine pores was used as a material for the insulator.

Test Example 1

The secondary batteries manufactured in Examples 1 to 5 and Comparative Examples 1 to 5 were subjected to electrolyte solution impregnation testing. The results are shown in Table 1 below. The electrolyte solution impregnation testing was carried out by injecting a 1M $LiPF_6$ carbonate electrolyte solution into the manufactured cylindrical battery case, measuring a time taken until impregnation ratio of the jelly-roll reached 100%, repeating this process four times and calculating an average of the four values.

In addition, a cap assembly was welded to the open top of the manufactured secondary battery to produce 10 samples. The samples were subjected to charge and discharge testing and short circuit was confirmed. The results are shown in Table 1 below.

TABLE 1

|  | Impregnation time (sec) | Time shortage ratio (%) (based on Comp. Ex. 1) | Number of short-circuited batteries (n) | Short circuit ratio (%) |
| --- | --- | --- | --- | --- |
| Ex. 1 | 304 | 56 | 0 | 0 |
| Ex. 2 | 311 | 55 | 0 | 0 |
| Ex. 3 | 306 | 56 | 0 | 0 |
| Ex. 4 | 383 | 45 | 0 | 0 |
| Ex. 5 | 305 | 56 | 0 | 0 |
| Comp. Ex. 1 | 698 | 0 | 2 | 20 |
| Comp. Ex. 2 | 538 | 23 | 4 | 40 |
| Comp. Ex. 3 | 301 | 57 | 1 | 10 |
| Comp. Ex. 4 | 692 | 1 | 2 | 20 |
| Comp. Ex. 5 | 605 | 13 | 0 | 0 |

As can be seen from Table 1, the batteries of Examples 1 to 5 according to the present invention had considerably shortened electrolyte solution impregnation time, as compared to Comparative Examples 1 to 4. That is, it could be seen that the electrolyte solution was efficiently permeated through a plurality of fine pores provided in the insulator.

The battery of Comparative Example 2 exhibited improved impregnation, but exhibited increased short circuit, as compared to the battery of Comparative Example 1, the battery of Comparative Example 3 also exhibited impregnation comparable to Examples 1 and 2, but exhibited higher short circuit rate. The reason for this was that metal powders were permeated through relatively large pores, causing short circuit in the jelly-roll.

On the other hand, the battery of Comparative Example 1 exhibited high short circuit rates as compared to the batteries of Examples 1 and 2, although fine pores were not perforated in the insulator on which the battery of Comparative Example 1 was mounted, as shown in Examples 1 and 2. The reason for the high short circuit rate was believed to be due to the fact that, in the batteries of Examples 1 and 2, movement of metal powders was suppressed when metal powders were entrapped in the fine pores, but, in the battery of Comparative Example 1, metal powders were freely moved on the smooth surface of the insulator and were moved to the jelly-roll through the circumference of the inlet or insulator.

The battery of Example 3 had substantially the same impregnation and short circuit rate, as that of Example 1, since it was different from that of Example 1 in terms only material for a sheet.

Also, it was seen that batteries of Example 4 and Example 5 using coarse woven and non-woven fabrics could considerably reduce an electrolyte solution impregnation time, as compared to batteries of Comparative Examples 1, 4 or 5, because of the fine pores that were formed in the fabric structure without separately forming fine pores.

Meanwhile, the battery of Comparative Example 5 used a woven fabric that did not form fine pores, thereby exhibiting slightly improved impregnation time, as compared to Comparative Example 1 using a PET sheet, but exhibiting deterioration in impregnation performance, as compared to Examples.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A secondary battery comprising:
   a jelly-roll having a cathode, an anode, and a separator disposed between the cathode and the anode structure in a cylindrical battery case;
   a plate-shaped insulator mounted on the top of the jelly-roll, the insulator including:
      a perforated inlet enabling gas discharge and penetration of electrode terminals; and
      a plurality of fine pores having a size of 1 μm to 100 μm;
      wherein the insulator comprises a non-woven fabric in which fibers made of a polymer resin or composite form fine pores,
      wherein the fibers are partially bonded through needle punching or thermal fusion, or using an adhesive agent to form a non-woven fabric,
      wherein the non-woven fabric is made of fibers, parts bonded by thermal fusion are disposed by a predetermined distance over the entire surface of the insulator, and protrusions that are not thermally fused are disposed between the bonded parts,
      wherein the protrusions are disposed on one or both surfaces of the insulator,
      wherein the fine pores are dispersed by a predetermined distance over the entire surface of the insulator,
      wherein the protrusions extend in transverse and longitudinal directions and cross each other to form a checker pattern, and
      wherein the protrusions have a same height.

2. The secondary battery according to claim 1, wherein the insulator is composed of an electrical-insulating polymer resin or an electrical-insulating polymer composite.

3. The secondary battery according to claim 2, wherein the polymer resin is one or more selected from the group consisting of polyethylene, polypropylene, polybutylene, polystyrene, polyethylene terephthalate, natural rubbers and synthetic rubbers.

4. The secondary battery according to claim 1, wherein the protrusions form an embossing pattern over the entire surface of the insulator.

5. The secondary battery according to claim 1, wherein the insulator has a thickness of 0.1 mm to 0.5 mm.

6. The secondary battery according to claim 1, wherein the battery is a lithium secondary battery.

7. A device comprising the secondary battery according to claim 1 as a power source.

8. The device according to claim 7, wherein the device is selected from a cellular phone, a portable computer, an electric vehicle, a hybrid electric vehicle, a plug-in hybrid electric vehicle and a device for power storage.

9. The secondary battery according to claim 1, wherein the insulator divides the cylindrical battery case into an upper chamber and a lower chamber,
   wherein the fine pores extend from the upper surface of the insulator to a lower surface of the insulator, and
   wherein the upper surface of the insulator forms a lower surface of the upper chamber.

10. The secondary battery according to claim 1, wherein the insulator is a single layer.

11. The secondary battery according to claim 1, wherein the insulator divides the cylindrical battery case into an upper chamber and a lower chamber,
   wherein the insulator has a top surface exposed to the upper chamber and a bottom surface exposed to the lower chamber, and
   wherein the fine pores extend between the top surface and the bottom surface.

* * * * *